Feb. 25, 1930.  J. E. MUHLFELD  1,748,612

INTEGRAL PISTON AND PISTON ROD FOR RECIPROCATING ENGINES

Filed Oct. 21, 1927

Inventor
John E. Muhlfeld
By his Attorney

Patented Feb. 25, 1930

1,748,612

UNITED STATES PATENT OFFICE

JOHN E. MUHLFELD, OF SCARSDALE, NEW YORK

INTEGRAL PISTON AND PISTON ROD FOR RECIPROCATING ENGINES

Application filed October 21, 1927. Serial No. 227,647.

This invention relates to improvements in reciprocating engines, and has particular reference to pistons and piston rods for such engines.

Prior to this invention, the usual practice in marine, stationary, and locomotive engineering has been to produce the pistons and piston rods as separate parts secured together by extraneous fastening means. Usually the pistons have been formed of cast iron or steel, while the rods have been formed of rolled or forged steel, and particularly in view of the different co-efficients of expansion of these two materials, it has been necessary to machine their mutually engaging portions very accurately, in order that they may be properly secured together without likelihood of becoming accidentally loosened. Usually, the forward end of the piston rod extends through the piston and is provided with a screw threaded portion upon which is engaged a clamping nut and said clamping nut is locked in position by means of a taper key or the like. The machine work necessary in producing these parts has been comparatively expensive, and furthermore, considerable weight is added to the assemblage by the clamping and locking means. Furthermore, such constructions have been objectionable, because the clamping nut is usually protruding from the head end of the piston in such a manner as to increase the surface areas with which the steam comes in contact during the operation of the engine and thereby increasing the heat losses due to condensation.

It is an object of the present invention to overcome the objectionable features of the prior art and to provide an integral piston and piston rod which will be extremely simple in construction, strong, durable in service, and of lighter weight than those which have been used heretofore.

More specifically, it contemplates the provision of a piston and piston rod integrally formed as a unit, they being produced either by casting, rolling, forging or the like from either iron or steel. A principal advantage of this construction lies in the substantial reduction of weight as well as a reduction in the condensation surface of the piston and results in increased efficiency for the engine in which the unit is mounted.

Other objects, features and advantages of the invention will be readily apparent from the following description taken in connection with the accompanying drawings, wherein the invention has been shown by way of illustration and wherein—

Figure 1:
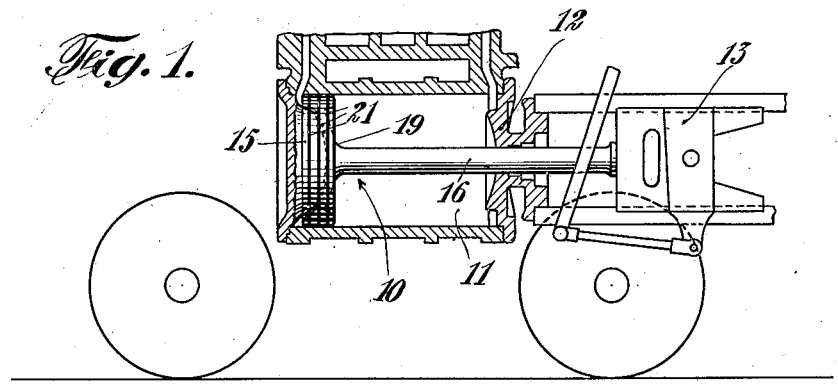
Figure 1 is a vertical, longitudinal, sectional view through a locomotive engine cylinder equipped with an integral piston and piston rod in accordance with this invention.

Referring now to the drawings in detail, the invention has been shown diagrammatically as embodied in a locomotive engine, the improved piston and piston rod being designated generally by the reference character 10 and shown as capable of reciprocation in the usual steam working cylinder 11 of the engine. The rearward end of the piston rod extends as usual through a cylinder head 12 and is connected in any ordinary or desired manner to a cross head 13, from which reciprocating motion of the piston is transferred to rotary motion of the driving wheels of the locomotive by a connecting rod not shown.

Figure 2:
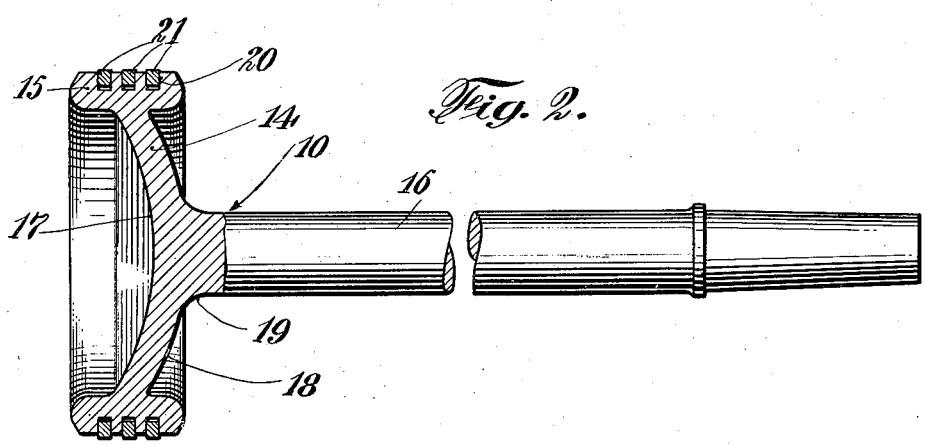
Fig. 2 is a longitudinal, sectional view on a larger scale through one form of improved piston.

One form of the improved piston is shown in detail in Figure 2, from which it will be seen that said piston assembly 10 comprises an annular portion 14 which is provided at its outer edge with a peripheral flange 15 and which has secured to its center, the piston rod 16. The annular body portion 14 is shown in this figure as being transversely dished and having its front surface 17 concave and substantially continuous and free from protuberances. The rear surface 18 of said body portion 14 merges with the surface of the rod 16 in a gradual curve, as indicated at 19. The peripheral flange 15 may preferably be of greater length than the thickness of the body portion 14 and extends equidistantly forwardly and rearwardly of the edge portions of said body. Any number of grooves 20 may be formed in said flange portion 15 for the accommodation of piston rings 21, whereby to insure a tight fit with the walls of the engine cylinder 11.

Figure 3:
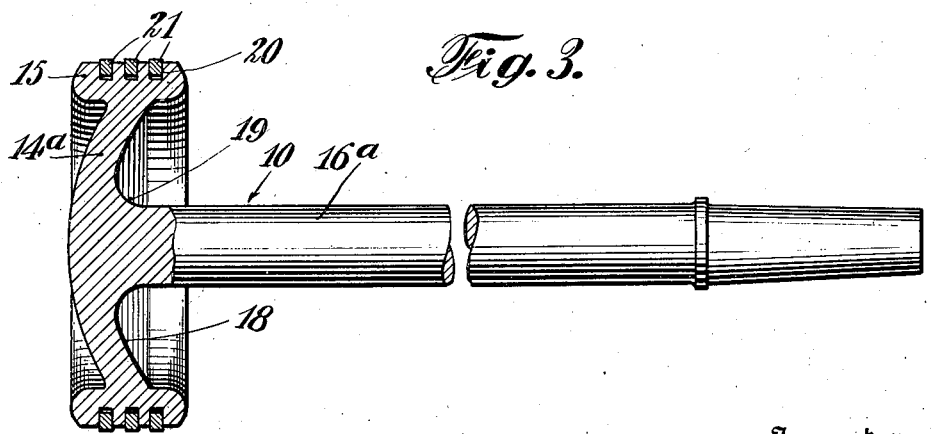
Fig. 3 is a similar view through a modified form of the invention.

In Figure 3, a slight modification of the invention is shown, wherein the body portion 14ª is transversely curved in the opposite direction from that of the previously described embodiment, whereby the head end of the piston is substantially convex, but in this form as in the other, the piston rod 16ª is integral with the body portion 14ª.

It will be evident that the machine work necessary in the production of this integral piston and piston rod is very little as compared with what was necessary with prior art structures, and for this reason, the manufacturing cost is very considerably reduced as is also the weight of the entire unit. Reduction of the weight contributes to increase of efficiency of the engine by making it easier to balance the fly-wheel or driving wheels as the case may be, and the elimination of protuberances from the head end of the piston contributes to increased efficiency by reducing the volume of the clearance space at the end of the cylinder and correspondingly reducing the condensation surfaces therein with which the live steam comes in contact.

As shown in Figure 1 the end of the cylinder which opposes the concave face of the piston is caused to bulge somewhat on the inside of the cylinder and the opposite end which opposes the convex face of the piston is made concave. Thus the clearance between the two sides or faces of the piston and the inner surface of the two heads of the cylinder is limited and the waste of steam is avoided.

Obviously, the invention is susceptible of numerous further modifications in the details of construction, and the right is herein reserved to make such changes as fall within the scope of the appended claims without departing from the spirit of the invention.

Having thus described my invention, what I claim is:—

1. As a new article of manufacture, a piston and piston rod comprising a one piece integral casting, said piston having a concavo-convex body wall integrally joined with the end of the piston rod, and a peripheral flange on said body wall projecting axially of the piston for substantially equal distances in opposite directions from said body wall.

2. As a new article of manufacture, a piston and piston rod comprising a one piece integral casting, said piston having a concavo-convex body wall integrally joined with the end of the piston rod, and a peripheral flange for the piston integrally joined at its inner face and intermediate of the opposite edges of said flange with the body wall of the piston.

3. As a new article of manufacture, a piston and piston rod comprising a one piece integral casting, said piston having a concavo-convex body wall and the end of the piston rod being integrally joined with the convex side of said body wall and said piston further including a peripheral flange directly and integrally joined with the body wall of the piston at a point in laterally spaced relation to the point of juncture of the piston rod with said body wall.

In testimony that I claim the foregoing as my invention, I have signed my name hereto.

JOHN E. MUHLFELD.